(12) United States Patent
Lu et al.

(10) Patent No.: US 11,682,813 B1
(45) Date of Patent: Jun. 20, 2023

(54) LITHIUM BATTERY AND MANUFACTURING METHOD THEREOF

(71) Applicant: Shenzhen Greensun Technology Co., Ltd., Shenzhen (CN)

(72) Inventors: Shuli Lu, Shenzhen (CN); Yajun Li, Shenzhen (CN); Qingyi Wang, Shenzhen (CN); Jin Zhang, Shenzhen (CN); Yangqing Luo, Shenzhen (CN); Yongchang Tang, Shenzhen (CN); Bainong Zhu, Shenzhen (CN); Fazuan Le, Shenzhen (CN)

(73) Assignee: Shenzhen Greensun Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/964,728

(22) Filed: Oct. 12, 2022

(30) Foreign Application Priority Data

Feb. 23, 2022 (CN) .......................... 202210166024.9

(51) Int. Cl.
*H01M 50/533* (2021.01)
*H01M 50/536* (2021.01)
*H01M 10/0587* (2010.01)
*H01M 10/0525* (2010.01)

(52) U.S. Cl.
CPC ..... *H01M 50/533* (2021.01); *H01M 10/0525* (2013.01); *H01M 10/0587* (2013.01); *H01M 50/536* (2021.01)

(58) Field of Classification Search
None
See application file for complete search history.

(56) References Cited

U.S. PATENT DOCUMENTS

| | | | | | |
|---|---|---|---|---|---|
| 5,972,532 | A | * | 10/1999 | Oweis | H01M 50/54 429/211 |
| 2016/0118640 | A1 | * | 4/2016 | Miyake | H01M 50/543 429/163 |

FOREIGN PATENT DOCUMENTS

| | | | | |
|---|---|---|---|---|
| CN | 112117496 | A | 12/2020 | |
| CN | 212571262 | U * | 2/2021 | ........ H01M 10/0525 |
| CN | 212571262 | U | 2/2021 | |
| CN | 114069113 | A | 2/2022 | |
| CN | 215869702 | U | 2/2022 | |
| JP | 2002075321 | A | 3/2002 | |
| JP | 2010267466 | A | 11/2010 | |
| WO | 2018190016 | A1 | 10/2018 | |
| WO | 2022014954 | A1 | 1/2022 | |

* cited by examiner

*Primary Examiner* — Jonathan Crepeau
*Assistant Examiner* — Angela J Martin

(57) ABSTRACT

Disclosed are a battery cell and a manufacturing method thereof, and a battery using the battery cell. The battery cell comprises a plurality of laminated plate sets, and each plate set is formed by laminating a positive plate, a separator and a negative plate; the positive plate is provided with a positive tab extending outwardly along the plate, and the positive tab is provided with a positive tab bend; or, the negative plate is provided with a negative tab extending outwardly along the plate, and the negative tab is provided with a negative tab bend; and a plurality of positive tab bends and/or negative tab bends of the plurality of laminated plate sets are laminated to form a bent book page-shaped structure.

7 Claims, 14 Drawing Sheets

LITHIUM BATTERY AND MANUFACTURING METHOD THEREOF

CROSS REFERENCE TO RELATED APPLICATIONS

This application claims foreign priority of Chinese Patent Application No. 202210166024.9, filed on Feb. 23, 2022 in the China National Intellectual Property Administration, the disclosures of all of which are hereby incorporated by reference.

TECHNICAL FIELD

The present invention belongs to the technical field of battery machining and manufacturing, and particularly relates to a battery cell and a manufacturing method thereof, and a battery using the battery cell.

BACKGROUND

Since Sony Company released the first commercial lithium ion battery in 1991, the lithium ion battery has been widely used in consumer electronics, electric vehicles, energy storage and other fields.

In a conventional lithium ion battery, an aluminum foil is used as a positive bus bar (also called a current collector) and a copper foil is used as a negative bus bar. With the development of battery industry, the bus bars have become main raw materials in battery production.

How to perform optimization design on the bus bars has always been a research topic for engineering technicians engaged in battery production and manufacturing.

SUMMARY

In order to solve the technical problems in the prior art, in a first aspect, the present invention provides a battery cell, which comprises a plurality of laminated plate sets, and each plate set is formed by laminating a positive plate, a separator and a negative plate; the positive plate is provided with a positive tab extending outwardly along the plate, and the positive tab is provided with a positive tab bend; or, the negative plate is provided with a negative tab extending outwardly along the plate, and the negative tab is provided with a negative tab bend; and a plurality of positive tab bends and/or negative tab bends of the plurality of plate sets are laminated to form a bent book page-shaped structure.

In a second aspect, the present invention provides a manufacturing method of a battery cell, which comprises: laminating to form a plurality of plate sets, wherein each plate set is formed by laminating a positive plate, a separator and a negative plate; and the positive plate is provided with a positive tab extending outwardly along the plate, and the negative plate is provided with a negative tab extending outwardly along the plate; bending the positive tab to form a positive tab bend; or, bending the negative tab to form a negative tab bend; and laminating a plurality of positive tab bends and/or negative tab bends of the plurality of plate sets to form a bent book page-shaped structure.

In a third aspect of the present invention, a lithium battery comprises a battery shell and a battery cell, wherein the battery cell forms a bent book page-shaped structure by laminating a plurality of positive tab bends and/or negative tab bends.

The present invention has the beneficial effects that: according to the battery cell structure used in the present invention, end faces may be directly converged and welded during laminating of the positive and negative plates, which reduces the following welding process, thus greatly improving an overall efficiency. Meanwhile, the lengths of the positive and negative tabs in the previous process are reduced, so that a material cost is also reduced to a certain extent, and a space utilization rate is also improved. Meanwhile, the battery cell may be quickly put into the shell after being welded, so that an efficiency of the following process is also greatly improved.

BRIEF DESCRIPTION OF THE DRAWINGS

The specific embodiments of the present invention are further described in detail hereinafter with reference to the drawings.

DETAILED DESCRIPTION

In order to make those skilled in the art better understand the solutions of the present invention, the technical solutions in the embodiments of the present invention are clearly and completely described with reference to the drawings in the embodiments of the present invention. Obviously, the described embodiments are merely some but not all of the embodiments of the present invention. Based on the embodiments in the present invention, all other embodiments obtained by those of ordinary skills in the art without going through any creative work should fall within the scope of protection of the present invention.

It should be noted that the terms "first", "second", etc. in the specification, the claims, and the drawings above are used to distinguish similar objects, and are not necessarily used to describe a specific order or sequence. It should be understood that data used in this way may be interchanged under appropriate circumstances, so that the embodiments of the present invention described herein can be implemented in a sequence other than those illustrated or described herein. In addition, the terms "comprising", "having" and any variations thereof are intended to cover non-exclusive inclusion. For example, a process, method, system, product or device including a series of steps or units is not necessarily limited to those steps or units clearly listed, but may comprise other steps or units not clearly listed in or inherent to the process, method, product or device.

Embodiment 1

An embodiment of the present invention provides a device for welding battery end faces and a process flow of welding battery end faces by the device.

Figure 1:
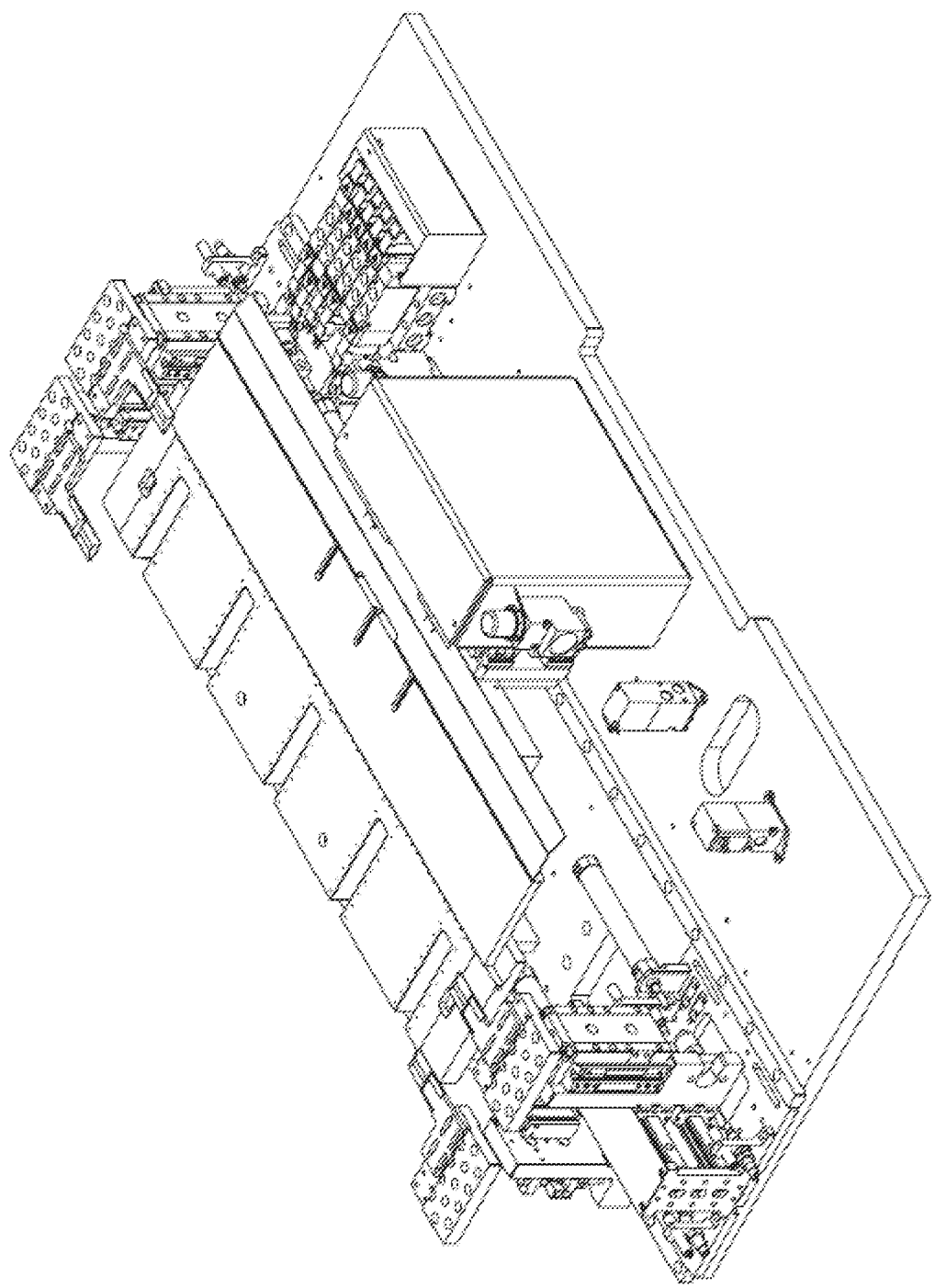
FIG. 1 shows a laminating station for welding battery end faces provided by an embodiment of the present invention.
Figure 2:
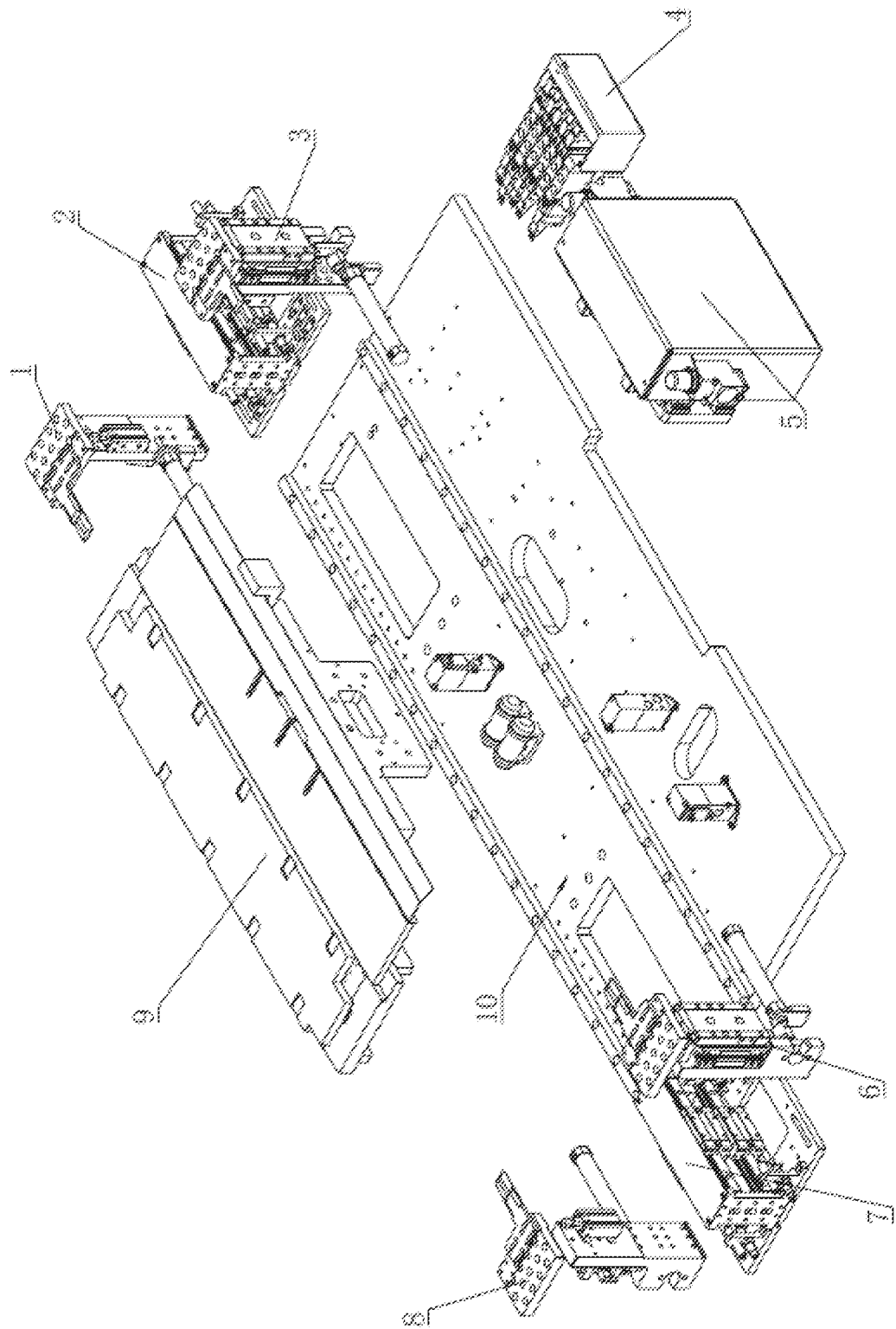
FIG. 2 is an exploded view of the laminating station for welding the battery end faces provided by the embodiment of the present invention.

The battery end faces are welded on a laminating platform. As shown in FIG. 1 and FIG. 2, wherein FIG. 1 shows a laminating station for welding the battery end faces, and FIG. 2 is an exploded view of FIG. 1, the laminating station mainly comprises clamping mechanisms on two sides of the laminating platform and a power assembly, wherein:

a right clamping mechanism comprises an upper right laminating and pressing claw 1, a right laminating and pressing claw base 2 and a lower right laminating and pressing claw 3;

the power assembly comprises a pneumatic solenoid valve 4 and a pneumatic control assembly 5; and a left clamping mechanism comprises an upper left laminating and pressing claw 6, a left laminating and pressing claw base 7 and a lower left laminating and pressing claw 8;

the laminating platform 9; and a laminating mechanism base 10.

In the embodiment, battery laminating and welding are circularly performed on different stations, which means that the battery plates are laminated on the laminating station, and then moved to a welding station for welding.

With reference to the structure shown in FIG. 1 and FIG. 2, a laminating process of a single plate illustratively comprises:

putting the positive plate or the negative plate on the laminating platform 9 by an external manipulator or a translation mechanism, pressing the plate by the upper right laminating and pressing claw 1 and the lower left laminating and pressing claw 8, and then covering a separator on the positive plate or the negative plate by an external separator unwinding mechanism; and then putting the negative plate or the positive plate on the laminating platform 9 by the external manipulator or the translation mechanism, and then covering the separator on the plate by the external separator unwinding mechanism. Therefore, a structure of 'plate-separator-plate' is formed.

It should be noted that, in the drawings, only a positional relationship among the plates and the separator during laminating is illustratively described, and a length, a thickness or a shape thereof is not quantitatively described. Actually, as a part of an energy storage ring in a battery cell, the plate is usually made of extremely thin metal, such as a copper foil or an aluminum foil. Even if a plating on the copper foil and the aluminum foil (such as a metal lithium plating or an element carbon plating) is taken into consideration, the plate is also very thin as a whole, ranging from tens of microns to a few tenths of millimeters. For the convenience of illustration, an actual dimension scale is not adopted in the drawings.

Figure 3:
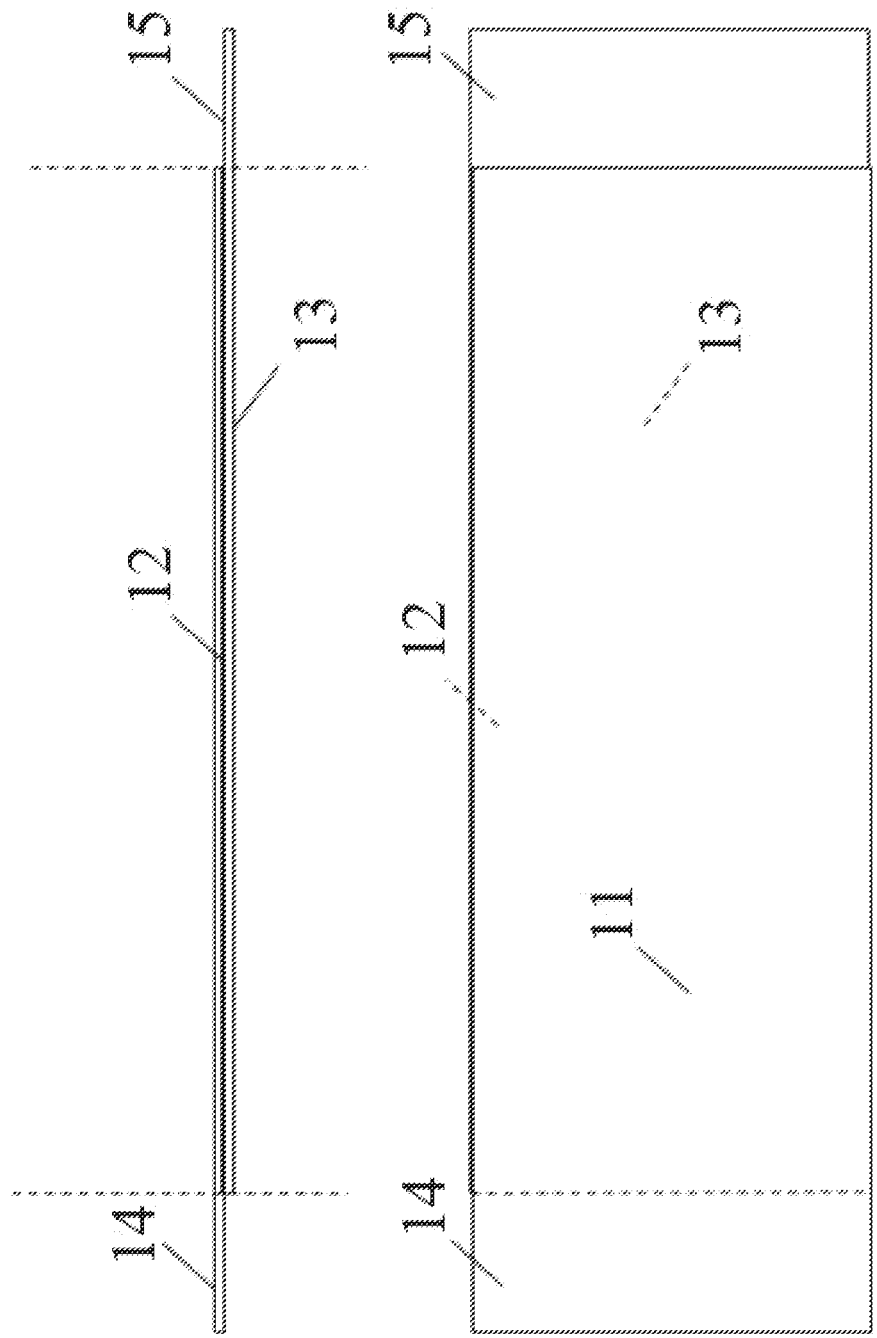
FIG. 3 is a schematic structural diagram of a laminated single plate set provided by the embodiment of the present invention.
Figure 4:
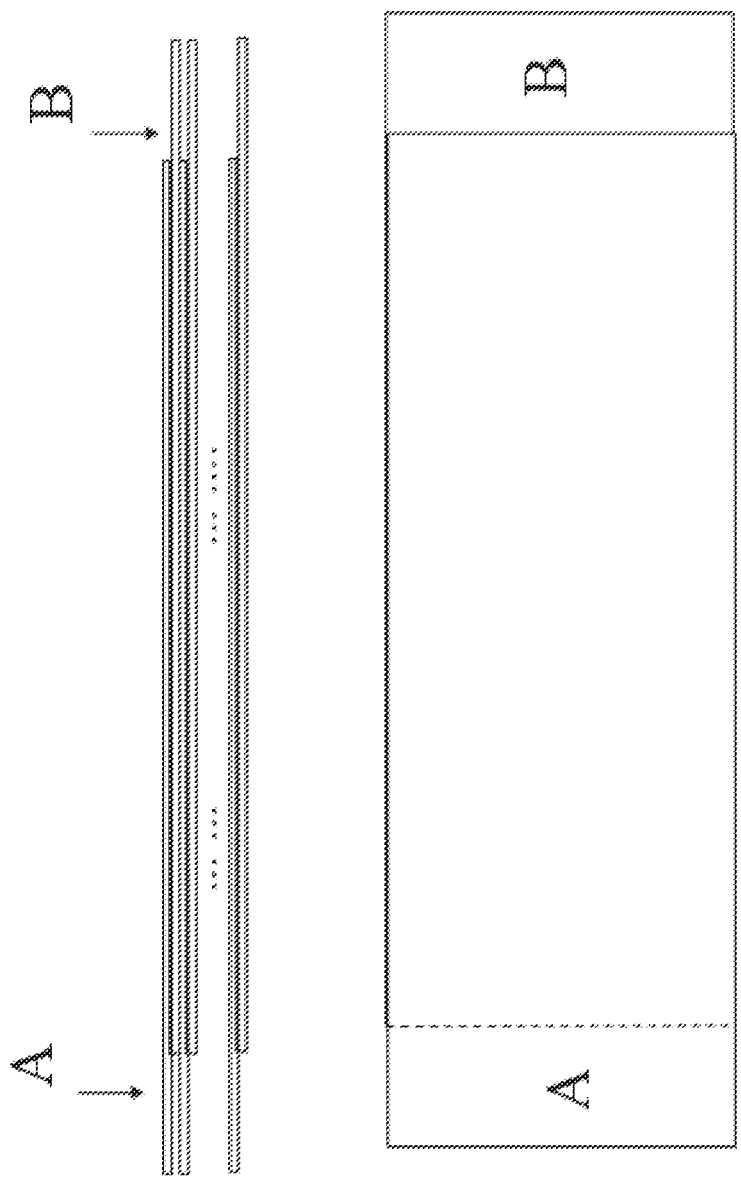
FIG. 4 is a schematic structural diagram of laminated multiple plate sets provided by the embodiment of the present invention.

As shown in FIG. 3, after laminating, positions of a first plate 11 and a second plate 13 are staggered, and overlapped parts of the first plate and the second plate are insulated by the separator 12, while non-overlapped parts of the first plate and the second plate form a first tab 14 and a second tab 15. One function of the tabs is to connect with a guide bar for outward guiding. Since the first plate 11 and the second plate 13 are plates with opposite polarities, the first tab 14 and the second tab 15 are tabs with opposite polarities, which means that when the first tab 14 is a positive tab, the second tab is a negative tab, and vice versa. The laminating steps are repeated on the laminating station to form a plurality of laminated structures of "first plate-separator-second plate". Due to alignment during laminating, a plurality of first tabs are overlapped from a perspective perpendicular to planes of the plates. due to a thin body material of the tab (the copper foil, the aluminum foil, etc.), a plurality of laminated tabs form a similar 'book page' structure of a book from a perspective parallel to the planes of the plates. FIG. 3 shows a laminated plate structure parallel to the planes of the plates (upper drawing) and perpendicular to the planes of the plates (lower drawing).

After laminating the single plate, the laminated single plate is circulated to the welding station. As shown in the drawing, the laminated plates are welded on the welding station by laser welding or ultrasonic welding. Illustratively, a plurality of laminated tabs are welded together at tab parts (points A and B in the drawing), then the welded tabs are welded on a copper bar, and then the copper bar is connected with an external shell to realize a current path between the plate and the shell.

In the welding process above, the laminating station and the welding station are two different stations, so that it is necessary to perform circular laminating, which means that the plates laminated on the laminating station are circulated to the welding station for alignment. If the single plate is transferred, since the plate and the tab are both very thin and light, plate bending or separator folding is prone to occur. The occurrence of bending or folding may affect a yield. Therefore, as an alternative to single lamination transfer, the laminating may be repeated for a certain number of times on the laminating station, until a number of plates required by the battery cell are laminated, and then a plurality of plates are transferred to the welding station.

During testing and debugging of the device and method described in the embodiment, it is also found that there is still room for improvement and optimization.

Firstly, in Embodiment 1, sufficient copper foil and aluminum foil need to be reserved at positive and negative end faces of the plates as the guide bars for guiding, and since reserved lengths must be sufficient, consumption of the copper foil and the aluminum foil can be increased. The positive and negative tabs both need to be separately led into the copper bar which is connected with the positive and negative tabs and used for positive and negative converging, and have a long length, so that an external shell of a larger size in a direction of the positive and negative tabs is needed, thus being failed to achieve an optimal volume.

Secondly, in Embodiment 1, more processes are needed, comprising multiple times of welding of parts that should be performed. For example, it is necessary to weld the positive tab and the negative tab, then weld the guide bar on a formed plane, and finally weld the guide bar with an end cover. Separate welding stations and fixtures are needed in the multiple times of welding, the alignment and other requirements during welding lead to a time-consuming welding process, and the multiple times of welding are prone to reduce the yield.

Thirdly, since the guide bar is made of flexible copper foil and aluminum foil, and the guide bar has a long length, dislocation and deformation of the positive and negative tabs may be caused during welding and battery cell transfer.

The following embodiments of the present invention will discuss how to optimize the technical solution of Embodiment 1.

Embodiment 2

In an embodiment of the present invention, the above-mentioned Embodiment 1 is improved, and a method for welding and converging end faces is provided. Firstly, the laminating station and the laminating method in Embodiment 1 may be used to laminate a positive and negative plate and separator set. The positive and negative plates or plate bags are laminated during laminating to form the positive and negative plate and separator set. As shown in the drawing:

the positive plate and the negative plate form a positive and negative plate set, and are separated by a separator. A positive tab is located at one end of the positive plate and connected with the positive plate; and a negative tab is located at one end of the negative plate and connected with the negative plate.

Figure 5:
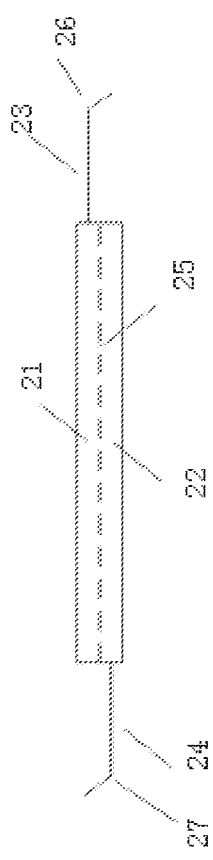
FIG. 5 is a schematic structural diagram of a laminated single plate provided by an embodiment of the present invention.

As shown in FIG. 5, for the purpose of optimization, sufficient tabs (copper foil and aluminum foil) need to be reserved at positive and negative end faces of the plates as the guide bars for guiding, and since reserved lengths must be sufficient, consumption of the copper foil and the aluminum foil can be increased, and a volume of an external shell may be affected. A shape of the tab is improved in the embodiment.

The length of the tab is reserved because the tab (copper foil, aluminum foil, etc.) is very thin, which leads to a flexible body of the tab, so that it is necessary to weld the tab to the copper bar and then weld the copper bar to connect onto the shell. Moreover, the laminated plate set has been introduced with reference to FIG. 3 in Embodiment 1 that: a plurality of first tabs are overlapped from a perspective perpendicular to planes of the plates; and due to a thin body material of the tab (the copper foil, the aluminum foil, etc.), a plurality of laminated tabs form a similar 'book page' structure of a book from a perspective parallel to the planes of the plates. Therefore, the inventor thought that: in order to reduce the length of the tab, a mechanical characteristic of the similar 'book page' structure of the plate set could be utilized. Specifically, when a plurality of tabs remain undeformed as shown in FIG. 3, there is no acting force between the tabs. A single plate is easily deformed under an external force due to a material and thickness thereof, and if the plurality of tabs are bent or curved (like a bent book), then there may be a stress between the plates, wherein the stress comprises a deformation elasticity of the tabs and a stress between adjacent tabs. In this case, the plurality of tabs, as a stressed whole, may show a physical property different from bending of a single tab. According to this, the inventor put forward a technical idea of shortening the reserved length of the tab by making use of the physical property of bending of the reserved tab after repeated experiments.

In an optional embodiment, as shown in FIG. 5, after laminating, positions of a first plate 21 and a second plate 22 are staggered, and overlapped parts of the first plate and the second plate are insulated by the separator 25, while non-overlapped parts of the first plate and the second plate form a first tab 23 and a second tab 24. A first tab bend 26 and a second tab bend 27 are formed on the first tab and the second tab respectively.

A positive tab bend and a negative tab bend are formed in each laminating step by mould pressing, and the plurality of tabs are laminated together after mould pressing, then welded in a bending manner by laser welding, ultrasonic welding or hot-melt welding, and then directly welded inside the battery shell.

Figure 6:
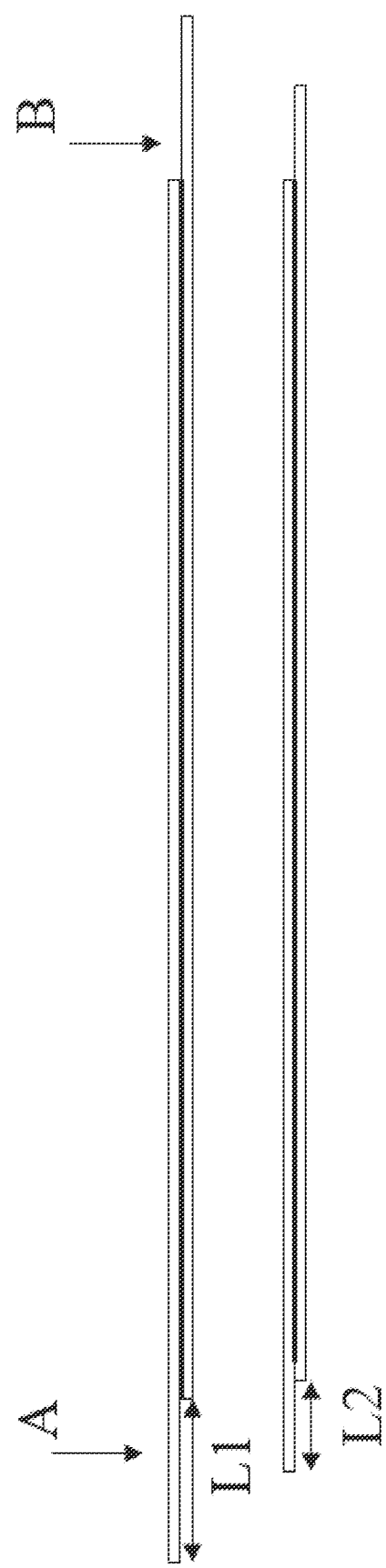
FIG. 6 is a comparison diagram of reserved lengths of tabs after using tab bends provided by an embodiment of the present invention.

As shown in FIG. 6, if the bending manner is adopted, multiple sets of tabs may be converged and then welded, and then directly welded onto the shell. By the solution, a reserved length L2 of the tab can be smaller than the length L1 of the tab in Embodiment 1. In this way, a cost on raw material can be greatly saved. In addition, due to the shortening of the length of the tab, an air gap between the plate set and the shell can be smaller, thus reducing a size of the external shell and satisfying a demand of further miniaturized size of the battery.

Embodiment 3

In the technical solution of Embodiment 2, laminating may be performed on the laminating station in Embodiment 1, then bending is performed by a mould pressing technology, and welding is performed on the welding station after converging. Considering physical properties of the material and thickness of the tab, the technical solution of Embodiment 2 can be further improved. After laminating, a plurality of positive tabs or negative tabs are overlapped in a 'book page shape', so that bending of a set of laminated tabs can be considered.

In an optional embodiment, a positive plate or a negative plate are put on a laminating platform 9 by an external manipulator or a translation mechanism, the plate is pressed by an upper right laminating and pressing claw 1 and a lower left laminating and pressing claw 8, and then a separator is covered on the positive plate or the negative plate by the external separator unwinding mechanism; and then the negative plate or the positive plate is put on the laminating platform 9 by the external manipulator or the translation mechanism, and then the separator is covered on the plate by the external separator unwinding mechanism. This step is repeated to form a structure of 'plate-separator-, . . . , -plate-separator'. When a preset number of laminations is reached, bends are formed at one positions of tab sets, which are called a positive tab bend set and a negative tab bend set respectively.

Different from mold pressing of a single tab, a plurality of tabs have a certain thickness, thus being easier to keep a certain shape, and a purpose of subsequent welding process is to weld the plurality of tabs. The mould pressing is conducive to alignment of the plurality of tabs, and flatting of the mould pressing process can avoid bending or folding of the thin single tab (such as a plate with a thickness of a few tenths of millimeters) during station circulation.

Figure 7:
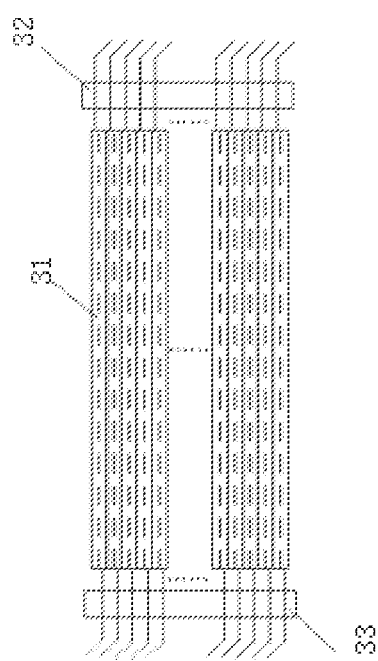
FIG. 7 is a schematic diagram of converging of multiple plate sets provided by an embodiment of the present invention.

As shown in FIG. 7, a laminated set 31 after laminating has the structure of 'plate-separator-, . . . , -plate-separator', the tabs are fixed at predetermined positions 32 and 33 for the tabs, and then multiple laminations of the laminated set are pressed and bent once by mould pressing. Tabs with different polarities have different bending directions.

Figure 8:
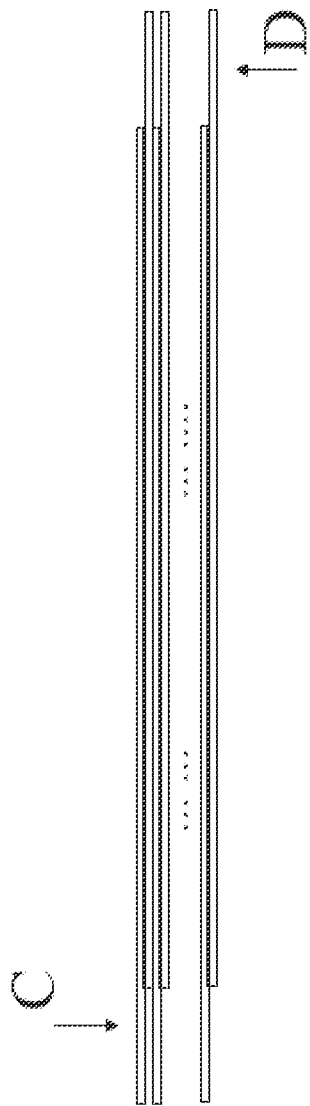
FIG. 8 is a schematic diagram of bending directions of the plates provided by the embodiment of the present invention.

In FIG. 8, in each small unit, 'first plate-separator-second plate' has a sandwich-like structure. During bending by mould pressing, an upper and left tab is bent in a C direction, and a lower and right tab is bent in a D direction. This bending manner avoids separating the plates from the separator by a stress direction applied by the mould pressing.

A manner of an upper and right tab is not shown in FIG. 8, but those skilled in the art can know according to the principle of the embodiment that, in this case, the mould pressing is applied to an upper plate in the bending direction C and applied to a lower plate in the reverse direction D. That is to say, in order to avoid separating the three-layer structure, a preferred force applying direction of the mould pressing is related to a position of the plate, wherein the force is applied to the upper plate downwardly, while the force is applied to the lower plate upwardly.

After being bent, the tabs (also called the tab set) on the plate set are converged by a converging device, then welded in a bending manner by laser welding, ultrasonic welding or hot-melt welding, and then directly welded inside the battery shell.

Similar to the technical effect of Embodiment 2, the bending manner of the tab set is adopted, and then multiple sets of tabs are converged and then welded, and then directly welded onto the shell. By the solution, a reserved length L2 of the tab can be smaller than the length L1 of the tab in Embodiment 1. In this way, a cost on raw material can be greatly saved. In addition, due to the shortening of the length of the tab, an air gap between the plate set and the shell can be smaller, thus reducing a size of the external shell and satisfying a demand of further miniaturized size of the battery.

Embodiment 5

Figure 9:
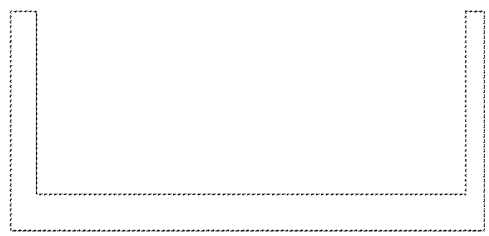
FIG. 9 is a schematic diagram of a converging device provided by an embodiment of the present invention.

In an embodiment, as shown in FIG. 9, converging may be implemented by a C-shaped converging device. A converging step is intended to align a laminated plate set. The converging may be performed before implementing mould pressing on the plate set.

Specifically, the laminated plate set is transferred to a C-shaped clamping position by a manipulator or a sucker, and then pressures in different directions are applied to the tabs by a mould pressing device at the C-shaped clamping position.

The converging by the C-shaped clamping position may realize bending and welding steps (comprising welding the tabs and welding the tabs with the shell) on the same station, which reduces an influence of station circulation on the plate set (tab bending and separator folding) and reduces an alignment requirement. A requirement of assembly line space of a plurality of stations is also reduced, thus realizing 'assembly on the same station'.

Figure 10:
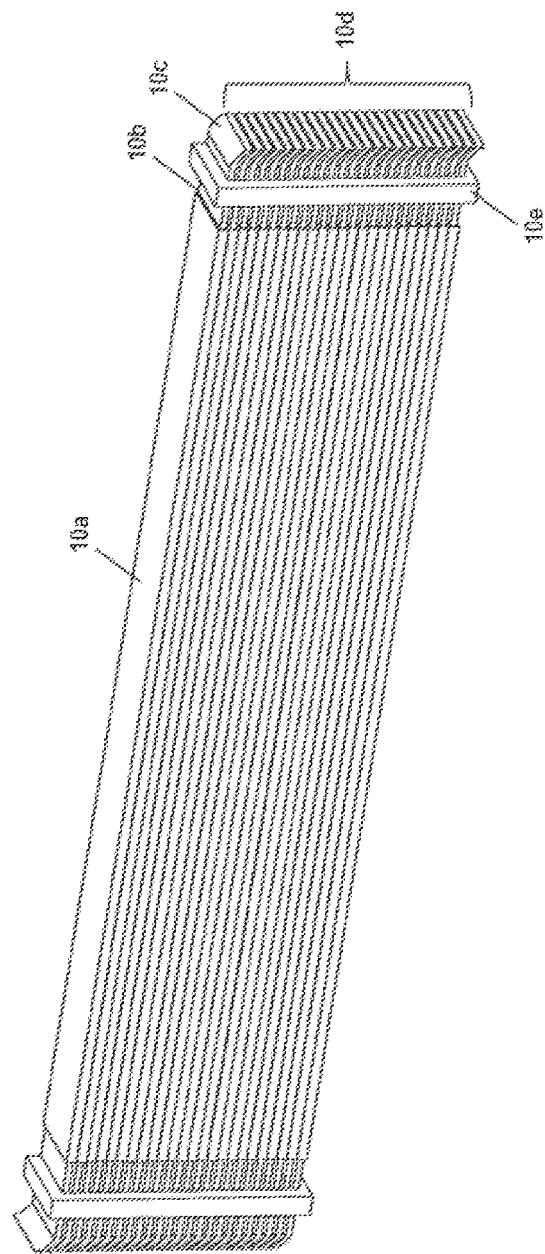
FIG. 10 is a schematic diagram of the plate sets clamped on the converging device provided by the embodiment of the present invention.

FIG. 10 is a schematic diagram of a plurality of plate sets clamped at the C-shaped clamping positions, two C-shaped clamping positions are respectively clamped at positive and negative tabs, and mould pressing is performed on the tabs on outer sides the C-shaped clamping positions to achieve preset bending. Then, the positive and negative tabs are welded to end face connectors to form a convergence by laser welding, electric resistance welding, ultrasonic welding and other means, and then quickly enter the shell to be welded to an end cover.

Figure 11:
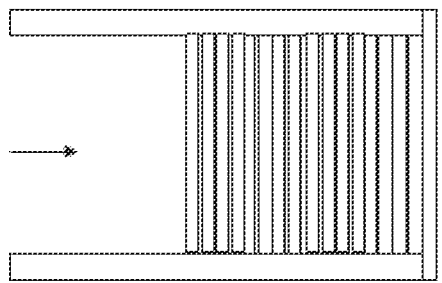
FIG. 11 is a schematic diagram of the converging device in a different shape provided by the embodiment of the present invention.
Figure 12:
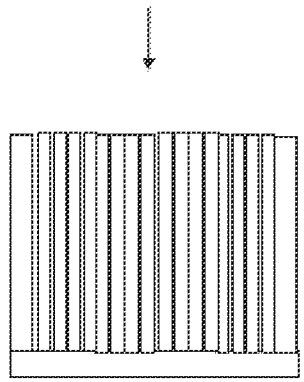
FIG. 12 is a schematic diagram of the converging device in a different shape provided by the embodiment of the present invention.

As shown in FIG. 11 and FIG. 12, in addition to the C-shaped clamping position, a U-shaped clamping position may also be used for converging. Optionally, the C-shaped clamping position comprises two vertically movable clamping plates. Optionally, the U-shaped clamping position comprises two horizontally movable clamping plates.

For the light and thin plate, tab folding is not easy to occur when transferring the plate set to the C-shaped clamping positions by the manipulator.

Embodiment 6

Figure 13:
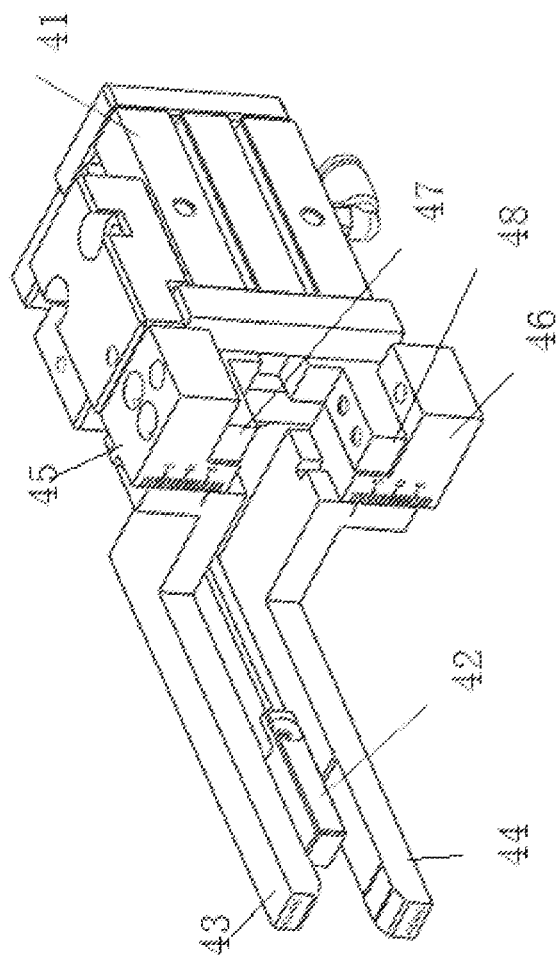
FIG. 13 is a schematic diagram of a mould pressing device provided by an embodiment of the present invention.

As shown in FIG. 13, an upper pressing mould 43 and a lower pressing mould 44 form a bent mould pressing shape, a tab 42 (positive tab or negative tab) to be subjected to mould pressing is translated between the upper and lower pressing moulds, and the upper and lower pressing moulds move closer to the middle. Under an action of mechanical stress, the tab is deformed and forms the same mould pressing shape.

In FIG. 13, the upper pressing mould 43 and the lower pressing mould 44 may move horizontally and vertically under control of a control module 41. For the horizontal movement, the control module 41 controls a push-pull cylinder to drive a push rod, so as to drive connecting blocks 47 and 48, and then drive the upper pressing mould 43 and the lower pressing mould 44 to move horizontally. For the vertical movement, the control module 41 controls a horizontal servo to drive vertical movement modules 45 and 46 to move vertically, and then drives the upper pressing mould 43 and the lower pressing mould 44 to move vertically. FIG. 13 is only an example of the pressing moulds.

Figure 14:
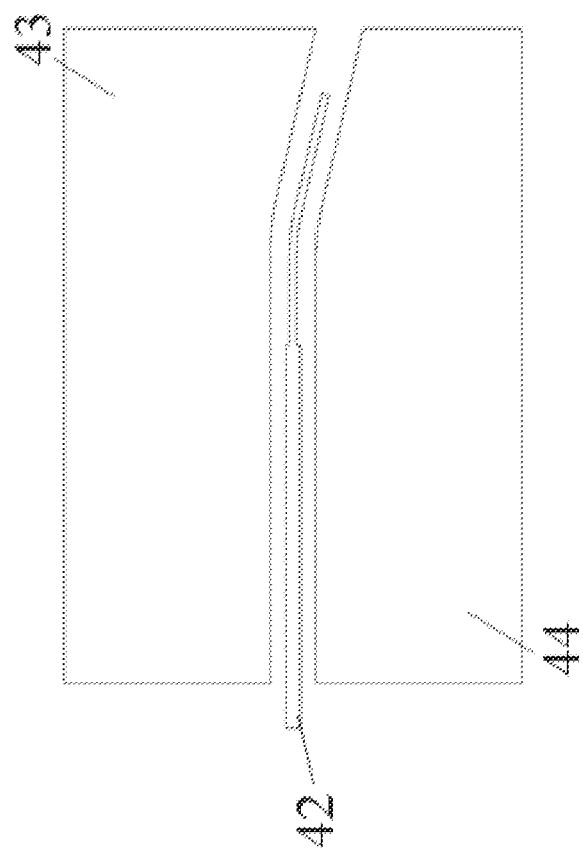
FIG. 14 is a schematic diagram of a bending shape of mould pressing provided by the embodiment of the present invention.
Figure 15:
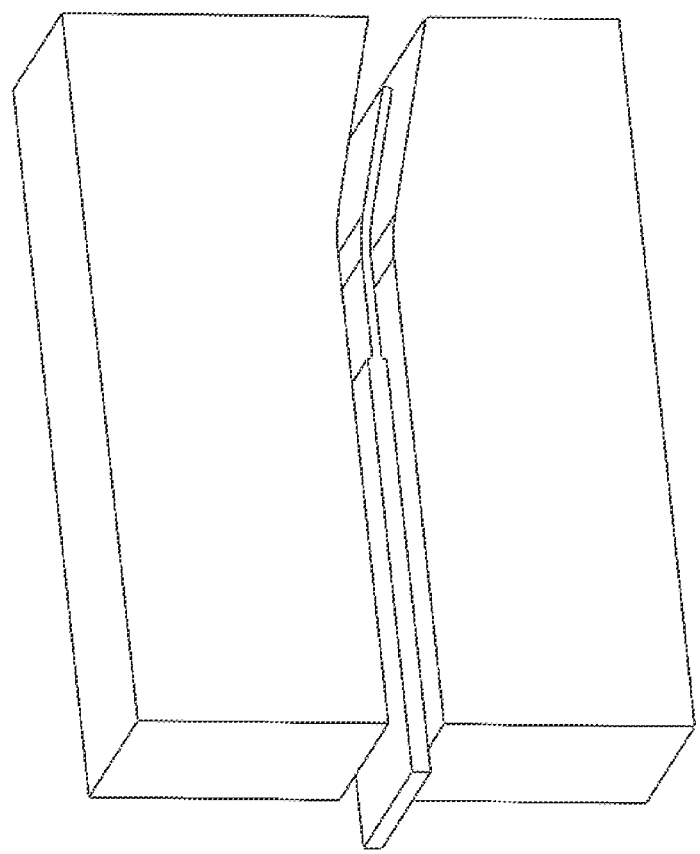
FIG. 15 is a schematic diagram of a bending shape of mould pressing provided by the embodiment of the present invention.

As shown in FIG. 14 to FIG. 15, the mould pressing shape formed by the upper pressing mould 43 and the lower pressing mould 44 is illustratively drawn, and the pressing moulds are provided with a straight section parallel to a plate and a bent section for forming a tab bend.

FIG. 14 to FIG. 15 only show a case of a single plate. When a plurality of tabs enter between the upper pressing mould 43 and the lower pressing mould 44, the plurality of tabs are all pressed into the same mould pressing shape, and the plurality of tabs are laminated on each other under pressures of the pressing moulds, showing a curved 'book page' shape shown in FIG. 10. Then, the bent and curved tabs may be directly welded.

FIG. 10 shows a plurality of laminated plate sets 10a, the plate sets are supported by a converging device 10e, and each plate set is formed by laminating a positive plate, a separator and a negative plate. The positive plate is provided with a positive tab 10b extending outwardly along the plate, and the positive tab is provided with a positive tab bend 10c; or, the negative plate is provided with a negative tab extending outwardly along the plate, and the negative tab is provided with a negative tab bend. A plurality of positive tab bends and/or negative tab bends of the plurality of laminated plate sets are laminated to form a bent book page-shaped structure (10d). It can be seen from FIG. 10 that the laminated plate sets have a book page structure, while bent parts of the positive and negative tabs have the bent book page-shaped structure. After converging and welding, the plate sets may quickly enter the shell.

Embodiment 7

An embodiment of the present invention provides a method for welding and converging end faces.

Figure 19:
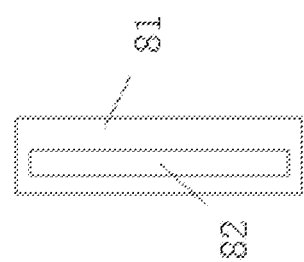
FIG. 19 is a schematic structural diagram of a bus bar provided by an embodiment of the present invention.

FIG. 19 shows a structure of a bus bar, wherein 81 refers to a bus bar body and 82 refers to a bus hole. The bus bar is elastic, and when a tab is stuck by the bus bar, the bus bar is prestressed by a mechanism to be expanded.

The method of the embodiment comprises the following steps. Firstly, a positive and negative plate and separator set is laminated, and after laminating, a positive bus bar and a negative bus bar are sleeved on a positive tab and a negative tab from two sides. Then, the positive tab and the negative tab are bent to attach to surfaces of the positive bus bar and the negative bus bar, one tab bend covers one tab bend, and the last tab bend (or the last several tab bends) is contacted with the bus bar to finally form a conductive entirety. After fixing, the positive and negative plate and separator set, and the positive bus bar and the negative bus bar are welded by electric resistance welding, laser welding or ultrasonic welding from left and right sides. A battery cell formed by welding will be directly circulated into the next process to be welded to a shell and a cover plate.

Certainly, the bus bar is not limited to only being laminated with the last plate, and the bus bar may also be sleeved with several tab bends through the bus hole.

The positive and negative plate and separator set has been described in the above-mentioned embodiment, which is composed of a positive plate, a negative plate, a positive tab, a negative tab and a separator. A positive tab bend and a negative tab bend are formed during formation of the positive tab and the negative tab, and lengths of the positive tab and the negative tab and bending positions of the positive tab bend and the negative tab bend are controlled by a program.

Reserved lengths of the tabs can be reduced in the previous coating process by adopting the solution, so that consumption of copper and aluminum materials can be saved, a size of an external shell is reduced to a certain extent while reducing the lengths of the tabs, and a weight of the battery cell is also reduced to a certain extent, thus increasing an energy density of the battery as a whole, and improving a space utilization rate. The bus bar is directly welded during laminating, so that the following welding step is reduced. The circulated battery cell can be fixedly formed, so that deformation and dislocation during circulation of the battery cell can be reduced, thus improving a product yield.

Embodiment 8

Figure 16:
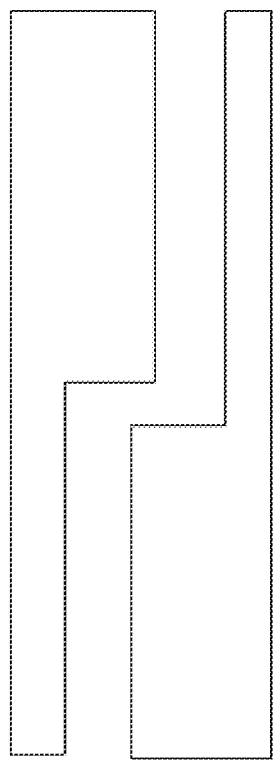
FIG. 16 is a schematic diagram of a bending shape of mould pressing provided by the embodiment of the present invention.
Figure 17:
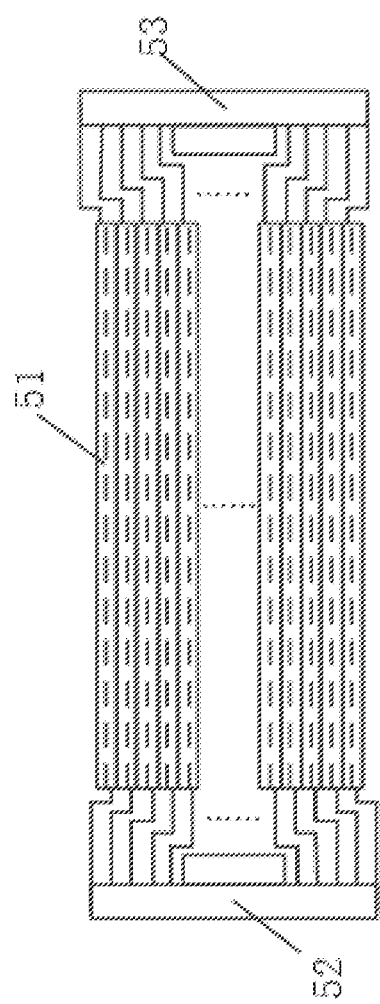
FIG. 17 is a schematic diagram of an embodiment of the present invention.
Figure 18:
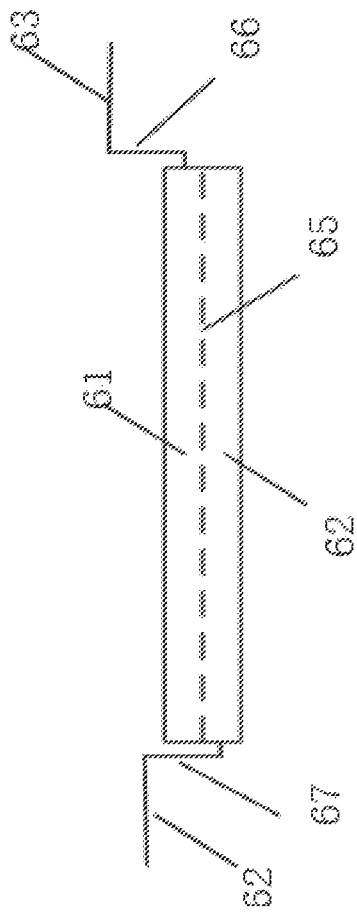
FIG. 18 is a schematic diagram of an embodiment of the present invention.

As shown in FIG. 16 to FIG. 18, an upper pressing mould and a lower pressing mould have a right-angle bending structure, so that a shape of a tab bend obtained by mould pressing is a right angle. Different from the above-mentioned embodiment, since a base material of a tab has a certain thickness, when the tab is bent into the right angle, there is not the situation that the surfaces of adjacent tabs are attached, one tab bend covers one tab bend, and the last tab bend is contacted with the bus bar to finally form a conductive entirety in the above-mentioned embodiment.

A positive and negative plate and separator set 51, a positive bus bar 52, and a negative bus bar 53 are shown in FIG. 17. The positive and negative plate and separator set 51 is shown in FIG. 18, which is composed of a positive plate 61, a negative plate 62, a positive tab 63, a negative tab 64 and a separator 65. A positive tab bend 66 and a negative tab bend 67 are formed during formation of the positive tab 63 and the negative tab 64, and lengths of the positive tab 63 and the negative tab 64 and bending positions of the positive tab bend 66 and the negative tab bend 67 are controlled by a program. The technology comprises the following steps. Firstly, the positive and negative plate and separator set 51 is laminated or wound, wherein the positive tab bend 66 and the negative tab bend 67 on an outermost layer are closest to the positive plate 61 and negative plate 62, and a middle layer is farthest away from the positive plate 61 and negative plate 62. The positive bus bar 52 and the negative bus bar 53 shown in FIG. 17 are inserted during laminating or winding of the positive and negative plate and separator set 51 shown in FIG. 17, and the positive and negative plate and separator set 51 shown in FIG. 17 is continuously laminated or wound. After the outermost layer is laminated or wound, the positive and negative plate and separator set 51 shown in FIG. 17 and the positive bus bar 52 and the negative bus bar 53 shown in FIG. 17 are welded by electric resistance welding, laser welding or ultrasonic welding from left and right sides. A battery cell formed by welding will be directly circulated into the next process to be welded to a shell and a cover plate.

Embodiment 9

In a specific design, a reserved length of a tab may be designed according to a size of a battery and a size of a plate. Without bending, the reserved length of the tab not only needs to satisfy a width of an air gap between an end face of the plate and a shell, but also needs to satisfy a welding requirement between the tab and an external copper bar.

Taking an air gap of 10 cm to be satisfied by length reservation as an example, according to a length of the copper bar and a welding area, a reserved length for welding the tab to the copper bar also needs to be 8 cm to 10 cm. A total length of the tab generally ranges from 10 cm to 30 cm.

However, when the end faces are converged and welded after bending the tabs, the welding to the copper bar is unnecessary, so that the reserved length of the tab is greatly reduced. Taking an air gap of x cm as an example, if a bending angle between the tab and a horizontal plane is θ, then a required reserved length of the tab is x/cos θ, so that the length of the tab may be calculated according to a value of θ.

Figure 20:
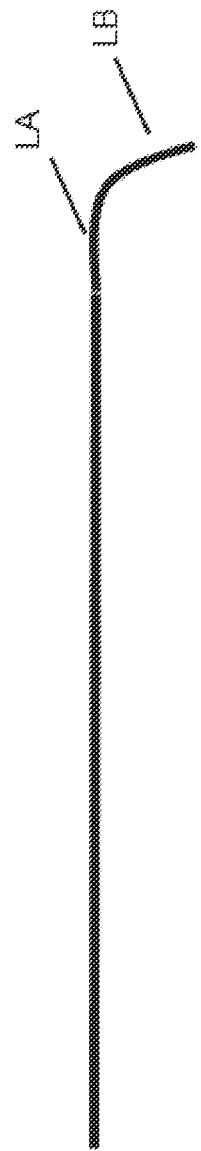
FIG. 20 is a schematic diagram of a shape of the tab bend provided by the embodiment of the present invention.

In an embodiment, when the end faces are converged and welded after bending the tabs, the tab is bent in sections. As shown in FIG. 20, the tab is bent at a length LA, and a length of a bent part is LB. By this method, welding between the bent part and the external shell can be ensured on one hand, and a problem that material consumption of the tab is increased due to an excessively long air gap between the end face of the plate and the shell can be avoided on the other hand. Taking the air gap of x cm as an example for calculation, the length of the tab is LA+(x−LA)/cos θ, wherein LB=(x−LA)/cos θ.

Since the tab bend is not a strict right angle, a tolerance δ may be introduced according to the bending angle in practical engineering. A calculation formula of the above is: LA+(x−LA)/cos θ+Δ.

In an embodiment, a shape of the tab bend is a curve surface. Taking FIG. 21 as an example, when a coordinate system is established along a length direction of the tab as an x axis and a direction perpendicular to the tab as a y axis, and a projection contour line of the curved surface on an xy plane may be represented by y=f(x).

A length of the bent part of the tab may be calculated by the following formula:

$$\hat{L} = \sqrt{(dx)^2 + (dy)^2} = \sqrt{(dx)^2 + (dx \cdot f(x))^2} = \sqrt{1 + (f'(x))^2} \cdot dx$$

$$L = \int_a^b \sqrt{1 + (f'(x))^2}\, dx$$

wherein upper and lower limits a and b of the integral represent a value range of the x axis of the contour line of the tab.

Figure 21:
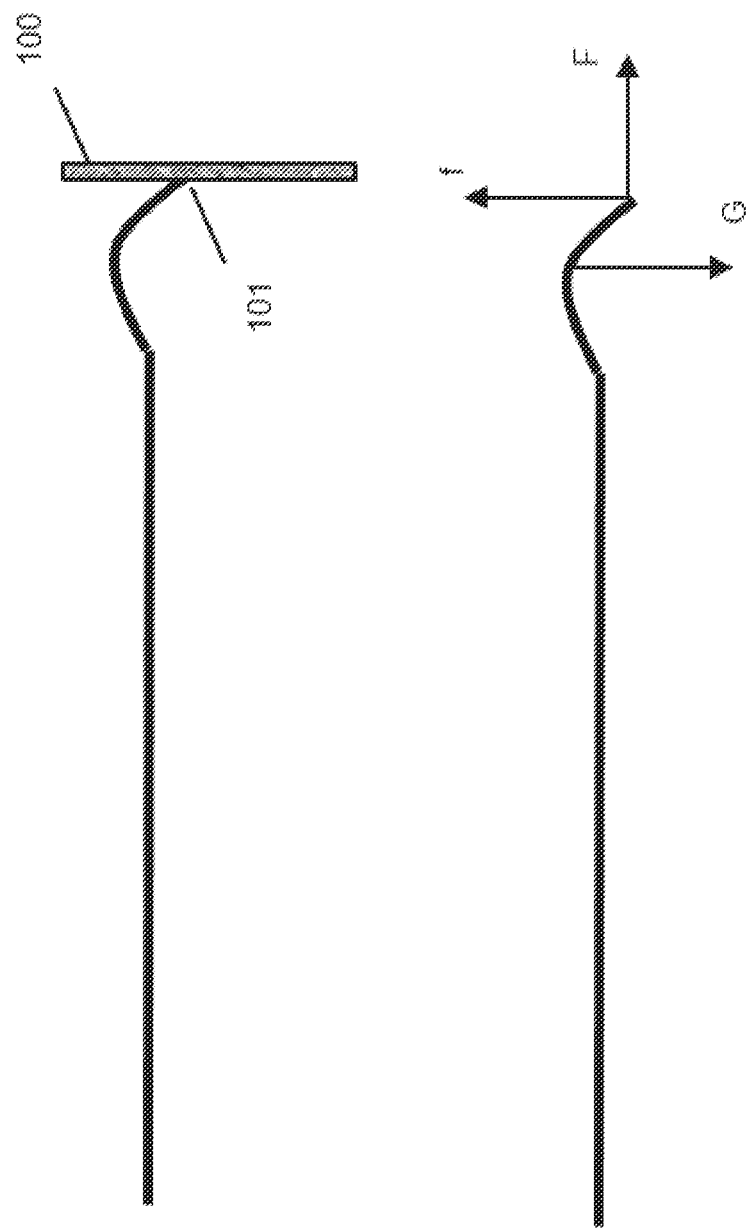
FIG. 21 is a schematic diagram of a stress condition of the tab after assembling the bus bar provided by the embodiment of the present invention.

Taking FIG. 21 as an example, the shape of the tab bend may be a quadratic curve. In the coordinate system established along the length direction of the tab as the x axis and the direction perpendicular to the tab as the y axis, the projection contour line of the curved surface of the tab bends upwardly (y>0) first, and after reaching a vertex of the quadratic curve, bends downwardly and passes through the x axis (y<0) to extend for a certain length.

Such design is used because the tab is made of metal (copper foil or aluminum foil), and after being bent upwardly and then bent downwardly, the bent tab forms an elastic force towards the shell based on a Hooke's law due to a nature of metal. A book page structure formed by a plurality of tabs is laminated by an internal friction force on one hand, and a resultant force F of the elastic force towards the shell is formed on the other hand. In this way, when the tab bend is contacted with the shell, a friction force f between the tab bend and the shell is generated due to the elastic force F, and the two forces easily form a stress balance with a dead weight G of the tab. Generally speaking, the bent plate is easily clamped on the shell by bending. In this way, a relative position between the bend of the plate and the shell is very stable during welding. Therefore, a yield of welding is greatly improved. After welding, the bend of the plate and the shell are also very stable, and are not easy to get out of welding or contact even if there is severe vibration, thus avoiding open circuit caused by an external force.

In an optional embodiment, taking FIG. 21 as an example, an outer wall of the shell is not vertical, but has a small inclined angle inwardly which may be within 5 degrees, or has a bulge on an inner side of the shell. Such design is used because when the tab bend is contacted with the shell, an overall stress direction is perpendicular to a surface of the shell, a friction force f between the tab bend and the shell is generated due to the elastic force F, and the two forces more easily form stable stress balance with a dead weight G of the tab. Generally speaking, the bent plate is easily clamped on the shell which is inclined inwardly or has the bulge by bending. In this way, a relative position between the bend of the plate and the shell is very stable during welding. Therefore, a yield of welding is greatly improved. After welding, the bend of the plate and the shell which is inclined or has the bulge are also very stable, and are not easy to get out of welding or contact even if there is severe vibration, thus avoiding open circuit caused by an external force.

Without loss of generality, the function f(x) may be a quadratic function, such as y=ax 2.

The f(x) may also be a power function or an exponential function. The f(x) may also be a piecewise function formed by the same or different types of functions. For example, when a=<x<t, then y=f1(x), and when x=t is an inflection point position of a continuous piecewise function, and t<x<b, then y=f2(x).

In an embodiment, the tab bend is bent at a length LA, and a shape of the bend is the f(x). The length of the tab is LA+LB, and LB may be calculated according to the following formula:

$$L = \int_a^b \sqrt{1 + (f'(x))^2}\, dx,$$

wherein upper and lower limits a and b of the integral represent a value range of the x axis of the contour line of the tab.

Embodiment 10

Various welding technologies used during welding and converging end faces will be described in the embodiment.

In ultrasonic welding, a 50/60 Hz current is converted into 15 KHz, 20 KHz, 30 KHz or 40 KHz electric energy by an ultrasonic generator. The converted high-frequency electric energy is converted into a mechanical motion with the same frequency again by a transducer, and then the mechanical motion is transmitted to a welding head through an amplitude transformer device capable of changing an amplitude. The welding head transmits received vibration energy to a joint of a workpiece to be welded, and in this area, the vibration energy is converted into heat energy by friction to melt a material.

Laser welding is an efficient and precise welding method in which a laser beam with a high energy density is used as a heat source. The laser welding is one of important applications of laser material machining technology. In 1970s, the laser welding was mainly used for welding a thin-walled material and low-speed welding, the welding process belonged to a heat conduction type, that was, a surface of a workpiece was heated by laser radiation, and heat on the surface was diffused into the interior through heat conduction, and by controlling parameters of width, energy, peak power and repetition frequency of a laser pulse, the workpiece was melted to form a specific molten pool.

Electric resistance welding is a method in which a strong current is used to pass through a contact point between an electrode and a workpiece, and heat is generated by a contact resistance to realize welding. A certain pressure needs to be applied to the electrode and the workpiece during welding. The electric resistance welding comprises spot welding, projection welding, seam welding, butt welding and electric resistance stud welding. Due to a short electrifying time, a high production efficiency and a stable welding quality, the electric resistance welding is applied in mass production of metal sheets with a welding thickness less than 3 mm.

The above is only the preferred embodiments of the present invention, and it should be pointed out that those of ordinary skills in the art may further make several improvements and decorations without departing from the principle of the present invention, and these improvements and decorations should also be regarded as falling within the scope of protection of the present invention.

The invention claimed is:

1. A lithium battery, comprising a battery shell and a battery cell;

the battery cell comprising:

a plurality of laminated plate sets, each plate set being formed by laminating a positive plate, a separator and a negative plate; and the positive plate being provided with a positive tab extending outwardly along the plate, and the negative plate being provided with a negative tab extending outwardly along the plate, wherein, the positive tab is composed of a straight section extending outwardly along the positive plate and a positive tab bend; and/or, the negative tab is composed of a straight section extending outwardly along the negative plate and a negative tab bend;

a plurality of positive tab bends of the plurality of plate sets are laminated to form a bent book page-shaped structure, a stress exists between adjacent positive tab bends in the bent book page-shaped structure, and the bent book page-shaped structure forms a stressed entirety under actions of the stress and an elastic force generated by deformation of the plurality of positive tabs;

and/or, a plurality of negative tab bends of the plurality of plate sets are laminated to form a bent book page-shaped structure, a stress exists between adjacent negative tab bends in the bent book page-shaped structure, and the bent book page-shaped structure forms a stressed entirety under actions of the stress and an elastic force generated by deformation of the plurality of negative tabs;

after the plurality of plate sets are clamped on a converging device, two converging devices are respectively clamped at the positive and negative tabs, the tabs are subjected to mould pressing on outer sides the converging devices to realize preset bending, the positive and negative tabs are welded to an end face connector to form a convergence, and then quickly enter the shell to be welded to an end cover;

the converging device is a C-shaped clamping position or a U-shaped clamping position; the C-shaped clamping position comprises two clamping plates capable of moving vertically; and the U-shaped clamping position comprises two clamping plates capable of moving horizontally; and when a coordinate system is established along a length direction of a tab as an x axis and a direction perpendicular to the tab as a y axis, and a projection contour line of a curved surface on which the tab is located on an xy plane is represented by y=f(x), a length of a bent part of the tab is calculated by the following formula:

$$L = \int_a^b \sqrt{1 + (f'(x))^2}\, dx$$

wherein upper and lower limits a and b of the integral represent a value range of the x axis of the contour line of the tab.

2. The lithium battery according to claim 1, wherein:
the bent book page-shaped structures formed by laminating the plurality of positive tab bends and/or negative tab bends have opposite bending directions; or the bent book page-shaped structures formed by laminating the plurality of positive tab bends and/or negative tab bends have the same bending direction.

3. The lithium battery according to claim 1, wherein the positive tab bend and/or the negative tab bend has a structure of bending upwardly along a direction of the plate to reach a vertex, then bending downwardly and passing through a plane on which the plate is located to extend.

4. A manufacturing method of a lithium battery, comprising:

laminating to form a plurality of plate sets, wherein each plate set is formed by laminating a positive plate, a separator and a negative plate; and the positive plate is provided with a positive tab extending outwardly along the plate, and the negative plate is provided with a negative tab extending outwardly along the plate, after the plurality of plate sets are clamped on a converging device, two converging devices are respectively clamped at the positive and negative tabs, the tabs are subjected to mould pressing on outer sides the converging devices to realize preset bending, the positive and negative tabs are welded to an end face connector to form a convergence, and then quickly enter the shell to be welded to an end cover;

the converging device is a C-shaped clamping position or a U-shaped clamping position; the C-shaped clamping position comprises two clamping plates capable of moving vertically; and the U-shaped clamping position comprises two clamping plates capable of moving horizontally;

when a coordinate system is established along a length direction of the tab as an x axis and a direction perpendicular to the tab as a y axis, and a projection contour line of a curved surface on which the tab is located on an xy plane is represented by y=f(x), then a length of a bent part of the tab is calculated by the following formula:

$$L = \int_a^b \sqrt{1 + (f'(x))^2}\, dx$$

wherein upper and lower limits a and b of the integral represent a value range of the x axis of the contour line of the tab;

the positive tab is composed of a straight section extending outwardly along the positive plate and a positive tab bend; and/or, the negative tab is composed of a straight section extending outwardly along the negative plate and a negative tab bend; and a plurality of positive tab bends of the plurality of plate sets are laminated to form a bent book page-shaped structure, a stress exists between adjacent positive tab bends in the bent book page-shaped structure, and the bent book page-shaped structure forms a stressed entirety under actions of the stress and an elastic force generated by deformation of the plurality of positive tabs;

and/or, a plurality of negative tab bends of the plurality of plate sets are laminated to form a bent book page-shaped structure, a stress exists between adjacent negative tab bends in the bent book page-shaped structure, and the bent book page-shaped structure forms a stressed entirety under actions of the stress and an elastic force generated by deformation of the plurality of negative tabs.

5. The method according to claim 4, comprising:
bending the plurality of positive tab bends and negative tab bends in the same direction;
or, bending the plurality of positive tab bends and negative tab bends in opposite directions.

6. The lithium battery according to claim 2, wherein:
each of the plurality of laminated plate sets is formed by laminating a positive plate, a separator, and a negative plate;
overlapped parts of the positive plate and the negative plate is insulated by the separator, and non-overlapped parts of the positive plate and the negative plate form the positive tab and the negative tab;
the positive tab is composed of the straight section extending outwardly along the positive plate and the positive tab bend; the negative tab is composed of the straight section extending outwardly along the negative plate and the negative tab bend;
wherein the positive tab bend and the negative tab bend have opposite bending directions, and both the positive tab bend and the negative tab bend are bent towards the separator located between the positive plate and the negative plate.

7. The method according to claim 5, wherein:
each of the plurality of laminated plate sets is formed by laminating a positive plate, a separator, and a negative plate;
overlapped parts of the positive plate and the negative plate is insulated by the separator, and non-overlapped parts of the positive plate and the negative plate form the positive tab and the negative tab;
the positive tab is composed of the straight section extending outwardly along the positive plate and the positive tab bend; the negative tab is composed of the straight section extending outwardly along the negative plate and the negative tab bend;
wherein the positive tab bend and the negative tab bend have opposite bending directions, and both the positive tab bend and the negative tab bend are bent towards the separator located between the positive plate and the negative plate.

* * * * *